J. H. SYLVESTERSEN.
DITCHING PLOW.
APPLICATION FILED JULY 17, 1914.
1,165,297.
Patented Dec. 21, 1915.
2 SHEETS—SHEET 2.
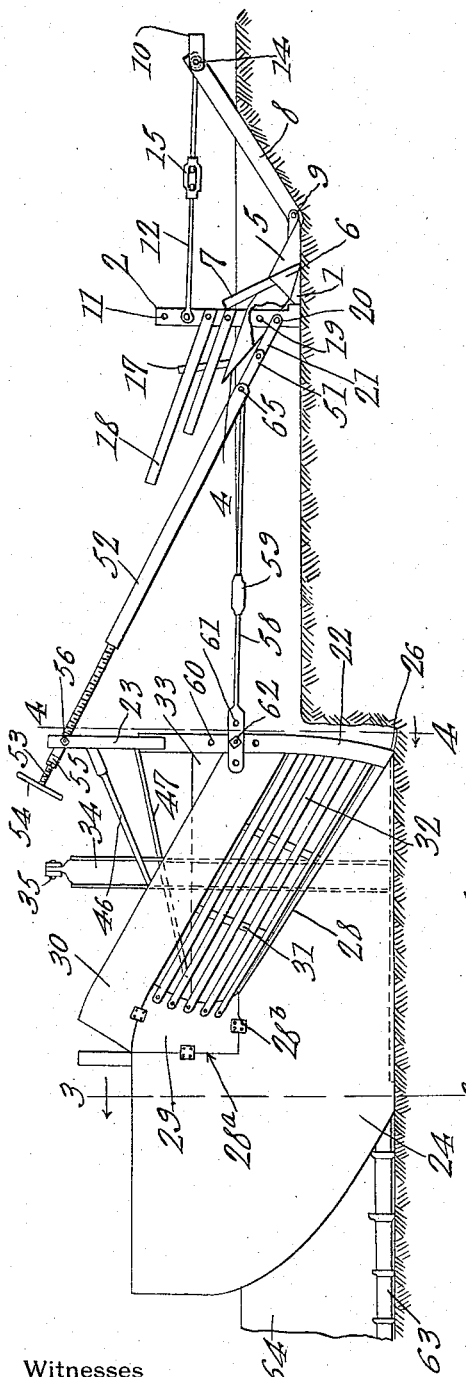
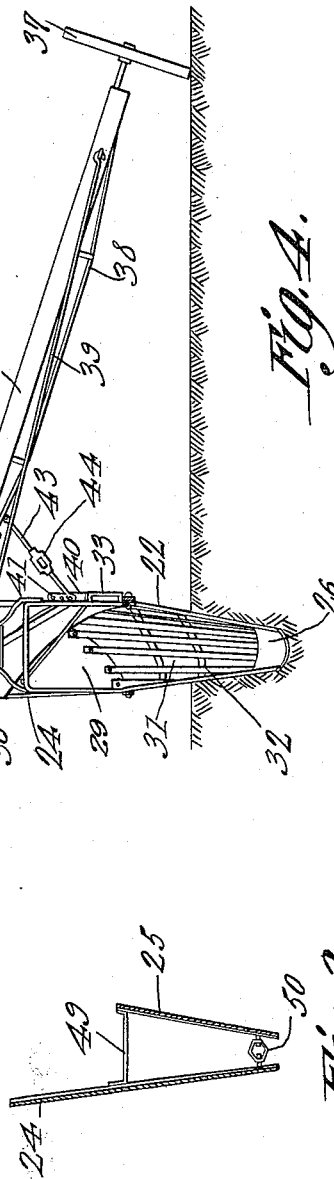
J. H. Sylvestersen
Inventor
Witnesses
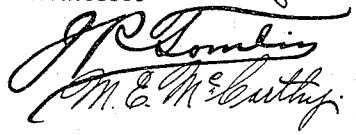
by
Attorneys

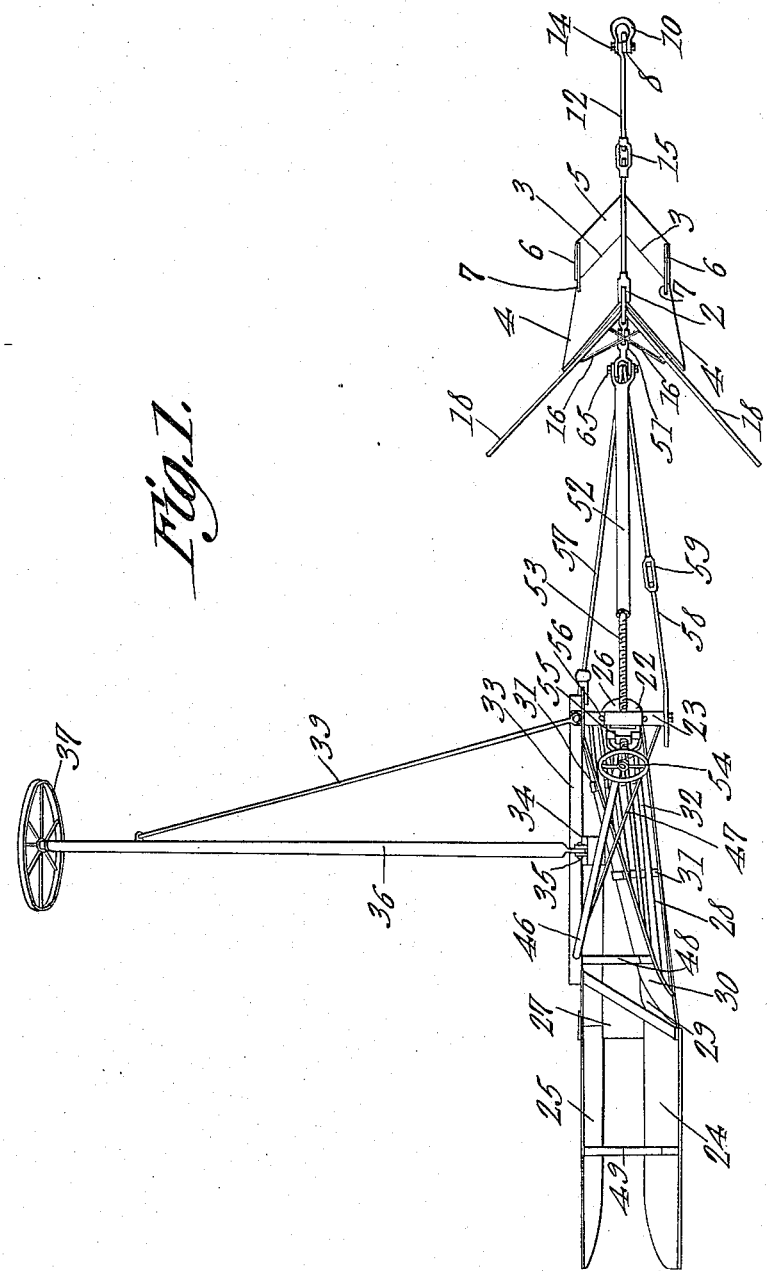

UNITED STATES PATENT OFFICE.

JORGEN H. SYLVESTERSEN, OF BELVIDERE, ILLINOIS.

DITCHING-PLOW.

1,165,297.  Specification of Letters Patent.  Patented Dec. 21, 1915.

Application filed July 17, 1914. Serial No. 851,513.

*To all whom it may concern:*

Be it known that I, JORGEN H. SYLVESTERSEN, a citizen of the United States, residing at Belvidere, in the county of Boone and State of Illinois, have invented a new and useful Ditching-Plow, of which the following is a specification.

One object of the present invention is to provide a ditching machine embodying a plow, operating in front of the ditcher proper and constituting means for cutting the sod and opening a shallow furrow in advance of the ditcher.

Another object of the invention is to provide a ditcher of the sort mentioned, in which an operator may stand, one side of the ditcher being lower than the other, so that the operator may reach out readily to one side of the trench and pick up the tiles, and lay the same in the trench, the other side of the ditcher being elevated to deflect the earth laterally.

The invention aims to improve the forward plow portion of the structure and to improve the construction of the ditcher proper.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows the invention in top plan; Fig. 2 shows the invention in side elevation, operating in a ditch; Fig. 3 is a cross section on the line 3—3 of Fig. 2; Fig. 4 is a cross section on the line 4—4 of Fig. 2.

In carrying out the present invention there is provided a forward plow which may be variously constructed. Preferably, however, the plow embodies a frame including a bottom bar or shoe 1 and a standard 2 projecting upwardly from the rear end of the bottom bar. The forward plow includes laterally inclined shares 3, extended between the bottom bar 1 and the standard 2, each share 3 including an upper section 4 and a lower section 5. The outer edges of the lower sections 5 are vertically extended to form side cutters 6 to which may be attached upwardly and rearwardly inclined auxiliary side cutters 7.

A forward cutter 8, preferably taking the form of a relatively narrow blade is pivoted as shown at 9 to the forward end of the bottom bar 1 adjacent the plow point. The forward cutter 8 lies approximately midway between the cutters 6 and extends in front of the plow point in an inclined position as shown in Fig. 2. By means of a pivot element 14, a clevis 10 is attached to the forward upper end of the cutter 8. In the standard 2 adjacent its upper end are formed a plurality of openings 11 in any of which may be mounted the rear end of a longitudinally adjustable connection 12, the forward end of which ordinarily is carried by the pivot element 14, a turnbuckle 15 being interposed in the connection 12.

The shares 3 of the forward plow are sustained by braces 16, the upper ends of the braces 16 being upwardly extended as shown at 17 and being connected with rearwardly and upwardly inclined deflector bars 18, the forward ends of which are united with the standard 2. In the standard 2 adjacent its lower end are formed a plurality of openings 19 adapted respectively to receive a pivot element 20 supporting a clevis 21. The clevis 21 thus may be adjusted vertically on the standard 2 to regulate the depth at which the forward plow works in the soil.

The ditcher proper embodies an arched cutter 22 to the upper end of which is secured a frame 23. The ditcher proper comprises a side plate 25 secured to one side portion of the arched cutter 22, and a side plate 24 disposed opposite to the side plate 25. Connecting the lower edges of the side plates 24 and 25, but terminating short of the rear ends of the side plates as shown in Fig. 1 is a platform 27 which is forwardly extended and preferably is connected with the lower portion of the arched cutter 22. Mounted in the bend of the arched cutter 22 is a forwardly extended scoop 26. At its forward end, the side plate 24 is provided with a downwardly inclined edge 28, to the rear of which is formed an upright edge 28ª.

The ditcher comprises an earth receiving cradle which is a composite structure, the cradle embodying a wing 29 secured to the edge 28ª of the plate 24 and to the adjacent longitudinal edge 28ᵇ thereof, the wing 29 projecting toward the longitudinal center of the ditcher, as will be clearly understood from Fig. 4. Attached to the upper edge of the wing 29 is a forwardly extended plate 30, the front end of which is attached to one side arm of the cutter 22. Cross strips 31 extend between the forward portion of the side plate 24 and the plate 30 and support longitudinal slats 32, the forward ends of which are secured to the cutter 22, the rear ends of which are secured to the wing 29. The plate 30 preferably overhangs the slats 32 slightly.

Secured to the outer face of the side plate 25 is a reinforcing bar 33. An upright 34 is secured to the inner face of the side plate 25 and projects upwardly above the upper edge of the said side plate. Pivoted as shown at 35 to the upper end of the upright 34 is a laterally extended downwardly inclined axle 36 at the outer end of which there is journaled a ground wheel 37. The axle 36 is reinforced by a truss rod 38. A brace 39 extends between the out end of the axle 36 and the frame 23. A bracket 40 is attached to the upright 34 and is provided with a plurality of openings 41. Eyes 42 are formed on the rod 38. A longitudinally extensible connection 43 may be mounted at its ends in any of the eyes 42 and in the openings 41 and in the connection 43 is interposed a turnbuckle 44. Through the coöperation of the parts above defined, the axle 36 is held firmly and securely in the outstanding position shown in Figs. 1 and 4. A brace 46 connects the reinforcing bar 43 with the frame 23 and a brace 47 extends between the bar 33 and the upper portion of the arched cutter frame 22, the forward ends of the braces 46 and 47 being horizontally spaced as clearly shown in Fig. 4. A brace 48 extends between the plate 30 and the side plate 25. The side plates 24 and 25 are connected by a brace 49. The side plates 25 and 24 are connected adjacent their lower edges and near their rear ends by a turnbuckle 50 which preferably is alined vertically with the brace 49.

A link 51 is pivoted to the rear end of the clevis 21 of the forward plow and the rear end of the link 51 is pivoted to the forward end of a tubular arm 52 into which is threaded a screw 53 provided at its rear end with a hand wheel 54. The screw 53 is rotatable in a bearing 55, but is held against longitudinal movement therein, the bearing 55 being pivotally supported as shown at 56, between the side arms of the frame 23. The pivot element 65 which unites the forward end of the tubular arm 52 with the rear end of the link 21 serves as a support for the forward ends of a pair of braces 57 and 58, a turnbuckle 59 being interposed in the brace 58. In the side portions of the cutter frame 22 there are formed openings 60 and in the rear ends of the braces 57 and 58 there are openings 61. In any selected pair of openings may be mounted bolts or other connecting means shown at 62, the openings 60 and 61 affording the necessary adjustment at the point indicated.

The ditch dug by the machine hereinbefore described is indicated at 64 and the tiles in the ditch are shown at 63.

In practical operation, when the structure is drawn forward, the center cutter 8 incises the sod. The sod and soil are carried laterally by the shares 3 of the forward plow, the side cutters 6—7 serving to incise the sod upon both sides of the cutter 8. As will be understood clearly the angle of the cutter 8 with respect to the horizontal or vertical may be adjusted by manipulating the turnbuckle 15 in the connection 12. The sod and loosened soil are thrown laterally by the deflector bars 18 and thus a comparatively shallow trench is opened in front of the main ditcher, the sod and attendant soil, together with roots and the like therein being thrown to one side.

By manipulating the turnbuckle 59, the effective length of the brace 58 may be increased or diminished at will. In this manner, the position of the forward plow transversely of the line of advance of the machine may be adjusted. The forward plow, therefore, may be so positioned that it will coöperate properly with the arched cutter 22 of the ditcher proper.

The ditcher proper, embodying the cutter 22 and attendant parts operates at a greater depth than does the forward plow, and serves to form the trench or ditch 64 in which the tiles 63 are placed. The soil is detached by the cutter 22 and the scoop 26 and is received on the slats 32 of the cradle and travels upwardly and rearwardly, being received by the wing 29, the latter element serving to carry the soil laterally and to deposit the same upon one side of the ditch, beyond the side plate 24.

An operator may stand upon the platform 27 as the machine moves forwardly. Noting, as shown in Fig. 3, that the side plate 25 is of less height than the side plate 24, it will be understood that the operator may reach over the upper edge of the side plate 25, pick up the tiles lying upon the surface of the soil, and place the same in the ditch, as indicated at 63 in Fig. 2. By manipulating the turnbuckle 50, the lower, rear portions of the side plates 24 and 25 may be moved toward and away from each other, the plates being sufficiently resilient to permit this operation. The contour of the ditch at its bottom, and the friction between the side plates 24 and 25 and the soil may thus be regulated. By rotating the screw 53, the ditcher proper may be tilted with the braces 57 and 58 as a fulcrum, thus lifting the rear end of the ditcher proper and swinging the same forwardly, to effect an elevation of the ditcher out of the ditch when the digging operation is completed.

Having thus described the invention, what is claimed is:—

1. A device of the class described comprising a ditcher; a soil opening plow operating in front of the ditcher; a forward cutter pivotally supported at the point of the plow and extended in front of the point of the plow, the forward cutter being vertically adjustable to vary the angle between the forward edge of the forward cutter and the soil; means for supporting the forward cutter in adjusted positions, thereby to vary the angle between the forward edge of the forward cutter and the soil; and means for connecting the plow with the ditcher.

2. A device of the class described comprising a ditcher; a soil opening plow embodying a frame; shares carried by the frame, a forward cutter pivoted to the frame adjacent the point of the plow, the forward cutter being vertically adjustable thereby to vary the angle between the forward edge of the cutter and the soil, a longitudinally extensible connection between the cutter and the frame and constituting means for adjusting the angle between the forward edge of the forward cutter and the soil; and means for connecting the plow with the ditcher.

3. A device of the class described comprising a ditcher; a soil opening plow located in front of the ditcher and embodying a frame; shares carried by the frame; upright side cutters carried by the lateral portions of the shares; an upright center cutter pivoted to the frame and located between the side cutters; a longitudinally extensible connection between the center cutter and the frame; and a connection uniting the plow with the ditcher.

4. In a device of the class described, a ditcher embodying an arched forward cutter; side plates secured to the cutter; an earth receiving cradle connected with the cutter and discharging laterally with respect to one of the side plates; and means for holding the rear portions of the plates in adjusted positions at different distances from each other.

5. In a device of the class described, a ditcher embodying an arched forward cutter; side plates coöperating therewith; an earth receiving cradle coöperating with the cutter and discharging laterally with respect to one of the side plates; a brace connecting the upper portions of the side plates adjacent their rear ends; and a longitudinally extensible connection uniting the side plates adjacent their lower edges and adjacent their rear ends.

6. A ditcher embodying an arched forward cutter; side plates coöperating with the cutter, one side plate being higher than the other, and the higher side plate having an upright forward edge; and an earth receiving cradle coöperating with the cutter and secured to the upright forward edge of said side plate.

7. In a device of the class described, a ditcher embodying an arched forward cutter; side plates coöperating with the cutter, one side plate being higher than the other; a platform connecting the side plates; and an earth receiving cradle coöperating with the cutter and discharging laterally across the higher side plate.

8. In a device of the class described, a ditcher; a plow located in front of the ditcher; and braces connecting the ditcher with the plow, one of said braces being longitudinally extensible, to provide for a lateral adjustment of the plow with respect to the ditcher.

9. In a device of the class described, a ditcher embodying a forward cutting frame; a plow; braces connecting the frame and the plow; an arm having a pivotal connection with the plow; a screw threaded into the arm; a bearing receiving the screw rotatably; and means for pivotally supporting the bearing on the frame.

10. In a device of the class described, a ditcher embodying a cutting frame; a plow; braces connecting the plow with the cutter frame; and a longitudinally extensible connection uniting the plow with the frame, the frame, the braces and the extension, defining the sides of a triangle.

In testimony that I claim the foregoing as my own, I have hereto affixed my signature in the presence of two witnesses.

JORGEN H. SYLVESTERSEN.

Witnesses:
A. GATES WHITE,
CHARLES N. ELLWANGER.

Copies of this patent may be obtained for five cents each, by addressing the "Commissioner of Patents, Washington, D. C."